United States Patent [19]

Sauber et al.

[11] Patent Number: 5,785,007

[45] Date of Patent: Jul. 28, 1998

[54] ANIMAL RESTRAINT DEVICE

[76] Inventors: Timothy D. Sauber, 37241 Fairview La., Lakevilla, Ill. 60046; Donald G. Sauber, 40480 Fairview St., Antioch, Ill. 60002

[21] Appl. No.: 748,541

[22] Filed: Nov. 13, 1996

[51] Int. Cl.⁶ .................................................. A01K 3/00
[52] U.S. Cl. .......................... 119/771; 119/786; 119/788
[58] Field of Search .................................. 119/771, 780, 119/786, 787, 788, 791; 52/155, 156, 160; 248/508

[56] References Cited

U.S. PATENT DOCUMENTS

| | | | |
|---|---|---|---|
| 323,022 | 7/1885 | Boone | 119/791 |
| 410,020 | 8/1889 | Presler | 52/155 |
| 461,753 | 10/1891 | Hall | 52/160 |
| 2,435,081 | 1/1948 | Howard | 119/786 |
| 2,706,967 | 4/1955 | Iannetti | 119/786 |
| 4,334,503 | 6/1982 | Carey, Jr. | 119/786 |
| 4,791,886 | 12/1988 | Anderson | 119/771 |
| 4,947,801 | 8/1990 | Glass | 119/771 |
| 5,044,323 | 9/1991 | Papak | 119/786 |

FOREIGN PATENT DOCUMENTS

| 455199 | 1/1928 | Germany | 119/791 |
|---|---|---|---|

*Primary Examiner*—Michael J. Carone
*Assistant Examiner*—Elizabeth Shaw
*Attorney, Agent, or Firm*—Hill & Simpson

[57] ABSTRACT

The animal restraint device holds an animal via a leash in a bed of a truck such that the leash cannot become tangled about the point of attachment. The device has a housing having an internal swivel device, the housing also having an aperture in an upper side thereof and a base on a lower side thereof. The housing has a predetermined no-catch contour. A rotatable securing device has a first end attached to the swivel device, the first end of securing device extending through the aperture. The rotatable securing device has a second end that forms a connector, the second end having a predetermined no-catch contour. A water resistant sealed roller bearing is located between the first end of the rotatable securing device and a wall of the aperture. The first end of the securing device is a threaded rod, the sealed roller bearing having an aperture through which the threaded rod extends. A nut assembly receives the threaded rod and thereby locks the securing device to the swivel device. An adapter plate is anchored to the bed of the truck, the adapter plate being removable attached to the base of the housing. The connector is attached to a first end of the leash, and the animal is attached to a second end of the leash.

19 Claims, 3 Drawing Sheets

1

ANIMAL RESTRAINT DEVICE

BACKGROUND OF THE INVENTION

It is a well known problem in the prior art that when a animal, such as a dog, is tied to a location, such as a tree or stake, etc., the animal will invariably get itself tangled about the point of attachment. Devices having a corkscrew type structure which are screwed into the ground are known. However, such devices are also known to be able to be pulled free by the animal as well as also tangling the leash which connects the animal to the stake.

It is also known in the art that many individuals, in particular, hunters, will transport dogs in the bed of a pickup truck. For safety of the dogs, the dogs are attached to locations in the pickup truck with a leash. However, it is known that the same problem occurs in that the dog can get the leash tangled about the point of attachment. The prior art has not provided any device which cannot insure that the dog would not become entangled about the point of attachment.

SUMMARY OF THE INVENTION

It is an object of the present invention to provide a novel animal restraint device such that the animal cannot tangle a leash about the point of attachment at the animal restraint device.

In general terms the present invention is an animal restraint device for holding an animal via a leash in a predetermined area. A housing has an internal swivel device, an aperture in an upper side thereof and a base on a lower side thereof. The housing has a predetermined outer configuration. A rotatable securing device has a first end attached to the swivel device. The first end of the securing device extends through the aperture. The rotatable securing device has a second end that forms a connector. A seal is located between the first end of the rotatable securing device and a wall of the aperture. An adapter plate is attached t the base of the housing. The adapter plate is anchored to the predetermined area and the connector is attached to a first end of the leash. The animal is attached to a second end of the leash.

Advantageous developments of the present invention are as follows.

The animal restraint device further has a fastening system for attaching the adapter plate at a predetermined location in a vehicle, more specifically, in the bed of a pickup-type vehicle.

In another embodiment the animal restraint device has a stake attached to the adapter plate on a side opposed to the base of the housing. The stake has a plurality of deformable prongs on an end opposed to an end of the stake that is attached to the adapter plate. The plurality of deformable prongs are initially directed in a substantially downward direction before the stake is inserted into the ground. The plurality of prongs are deformed into a substantially upward direction after the stake has been inserted into the ground, thereby providing resistance to removal of the stake from the ground.

The housing has an outer no-catch contour.

The base has at least one water outlet groove in a bottom side thereof.

The first end of the securing device is a threaded rod. The swivel device is a sealed roller bearing having an aperture through which the threaded rod extends. The animal restraint device further has a nut assembly that receives the threaded rod and thereby locks the securing device to the swivel device.

The second end of the said securing device has a no-catch configuration.

The seal is water resistant.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
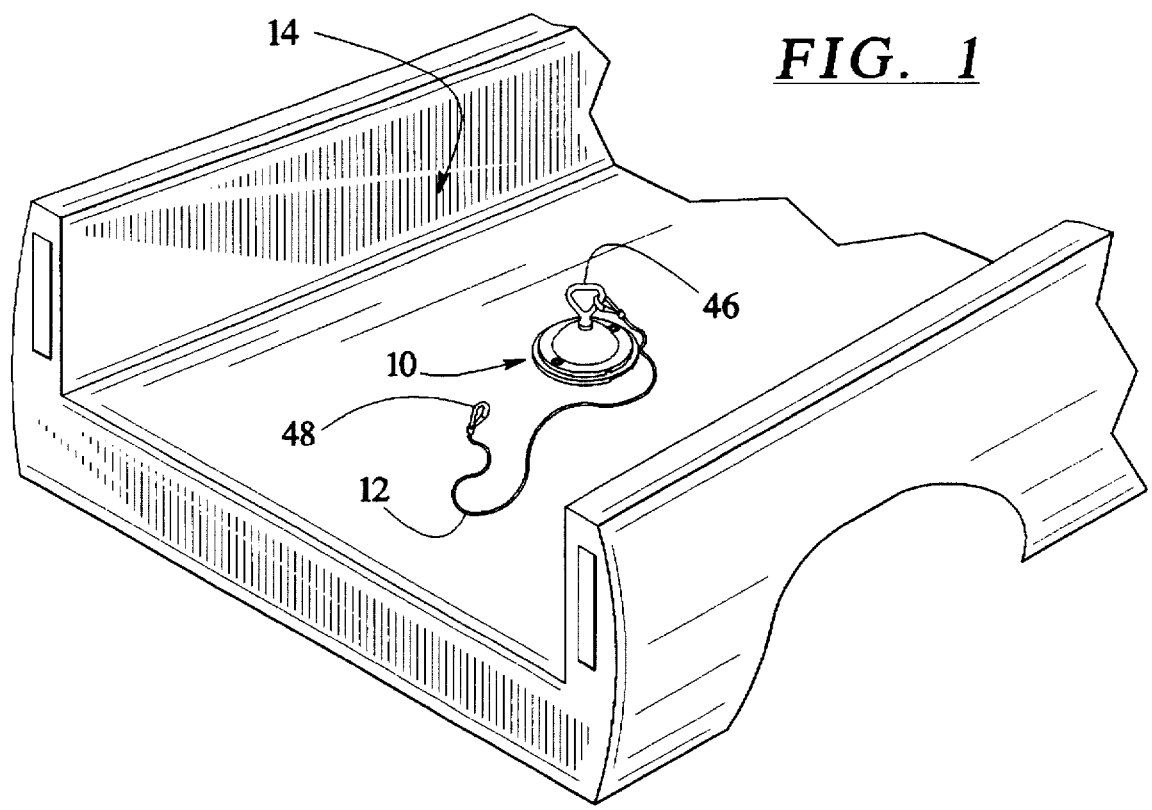
FIG. 1 is a perspective view of the animal restraint device of the present invention installed in the bed of a pickup truck.

FIG. 1 shows the animal restraint device 10 of the present invention installed in the bed 14 of a pickup truck. A leash 12 has a first end 46 connected to the animal restraint device 10 and a second end 48 which is used to attach an animal, such as a dog. The length of leash 12 would obviously be such that the dog cannot get out of the bed of the pickup truck. The animal restraint device 10 of the present invention allows the dog to move about the predetermined area in the bed 14 of the pickup truck without tangling the leash 12 about the animal restraint device 10.

Figure 2:
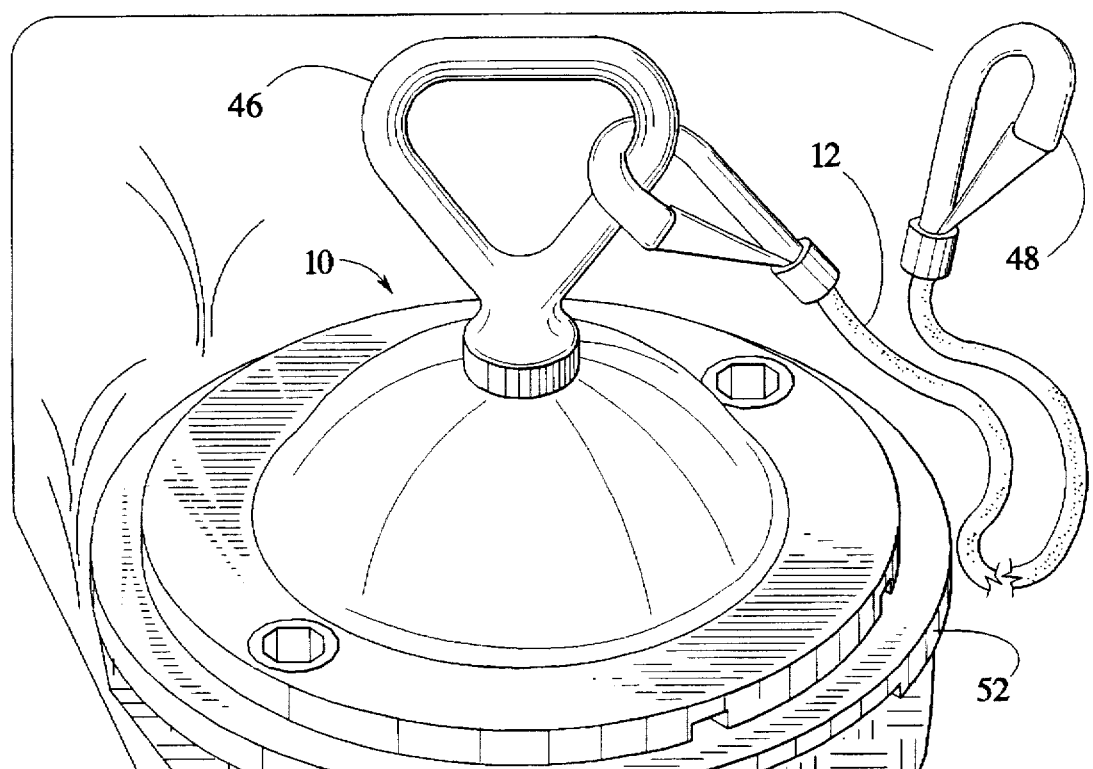
FIG. 2 is a perspective view of the present invention in an alternative embodiment.
Figure 6:
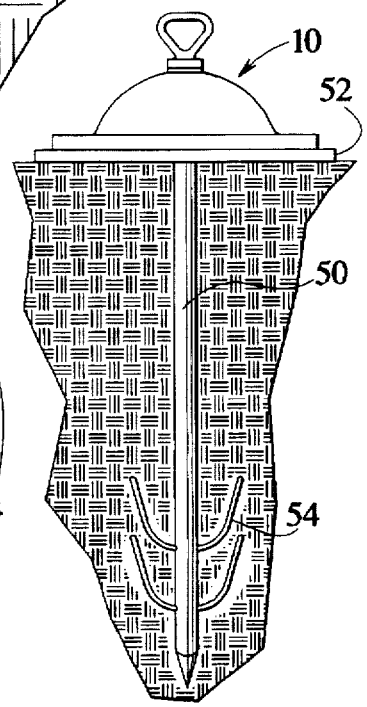
FIG. 6 depicts the ground stake after insertion in the ground.

FIG. 2 shows an alternative embodiment of the present invention in which the animal restraint device 10 further has a stake 50 with which the animal restraint 10 can be securely inserted into the ground. The stake 50 has a novel design which will securely hold animals without any tangling occurring with the leash 12. As will be explained below, it is a combination of several novel features which insures that the leash 12 will not become entangled about the animal restraint device 10. A feature of the present invention in that the animal restraint device 10 can be moved from the bed of the pickup truck to a ground location. This is of special importance to, for example, hunters wherein dogs must be transported to an open area and then tied up for periods of time in the open area.

Figure 3:
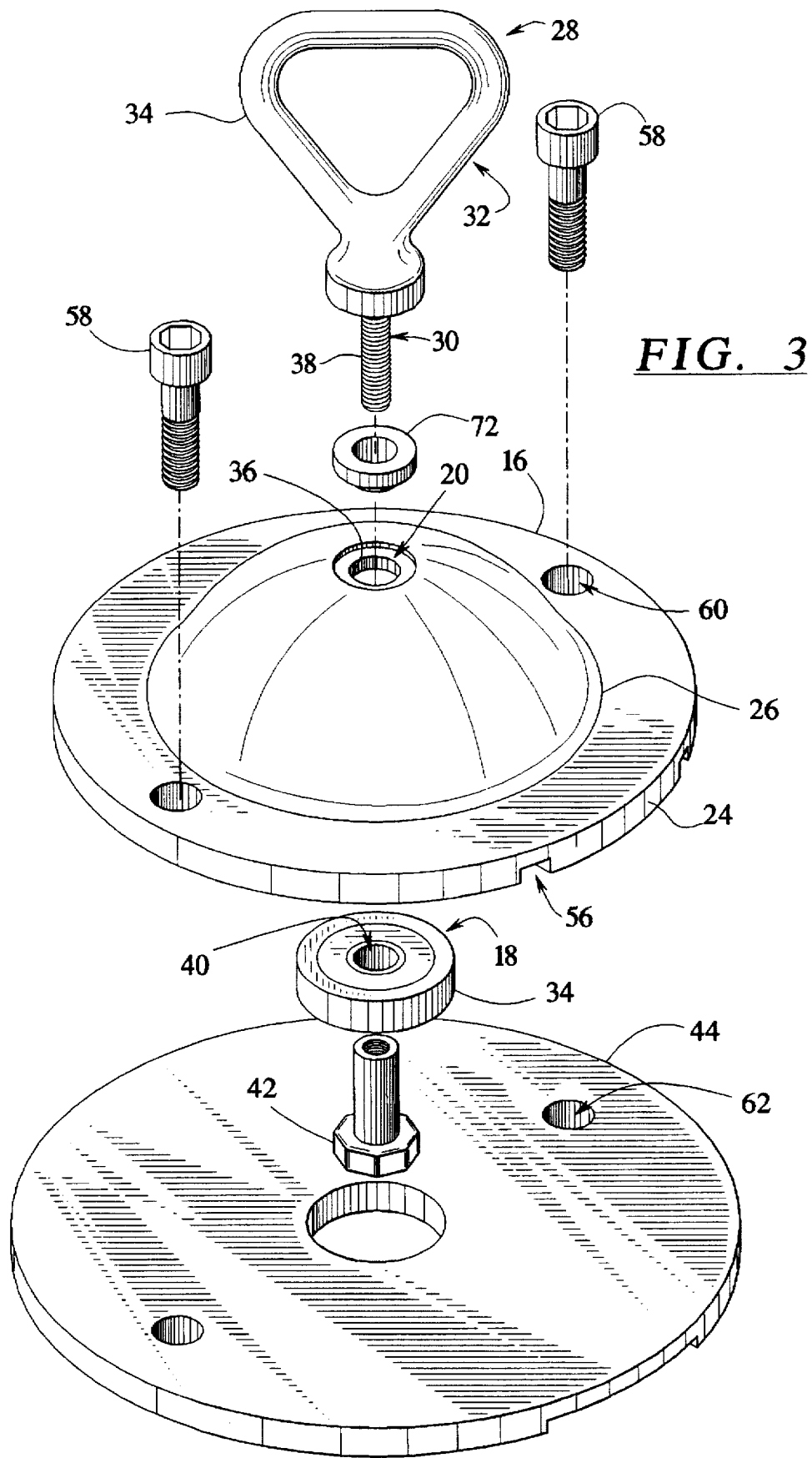
FIG. 3 is an exploded perspective view of the present invention.

The components of the animal restraint device of the present invention are shown in the exploded perspective view of FIG. 3. The housing 16 has an internal swivel device 18. The housing 16 has an aperture 20 in an upper side 22 thereof and a base 24 on a lower side 26 thereof. The housing 16 has a predetermined no-catch contour. It is this contour which is one of the features which contributes to the prevention of the leash 12 becoming tangled about the animal restraint device 10.

A rotatable securing device 28 has a first end 30 attached to the swivel device 18. The first end 30 of the securing device 28 extends through the aperture 20. The rotatable securing device 28 has a second end 32 that forms a connector 34, this second end 32 or connector 34 having a predetermined no-catch contour.

The internal swivel device 18 in the preferred embodiment is a water resistant sealed roller bearing 34 which is located between the first end 30 of the rotatable securing device 28 and a wall 36 of the aperture 20. The first end 30 of the securing device 28 is a threaded rod 38. A sealed roller bearing 34 has an aperture 40 through which the threaded rod 38 extends. A nut assembly 42 receives the threaded rod 38 and thereby locks the securing device 28 to the swivel device 18. An adapter plate 44 is anchored to the bed 14 of the truck. The adapter plate 44 is removable attached to the base 24 of the housing 16 via cap screws 58 which are inserted through holes 60 in the base 24 and are threaded into threaded holes 62 in the adapter plate 44. It is envisioned that there are various other means for attaching the adapter plate 44 to the bed of the truck and for attaching the base 24 to the adapter plate 44.

Figure 5:
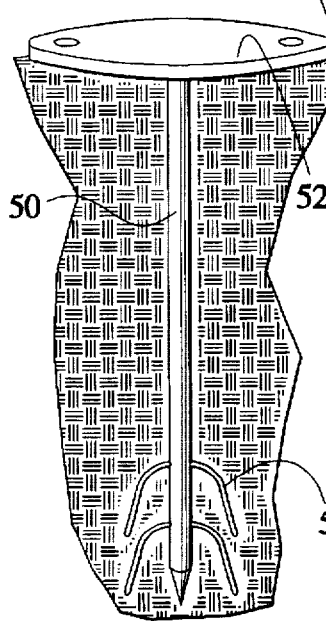
FIG. 5 is a perspective view of the ground stake used in the present invention.

FIG. 5 shows a further adapter plate 52 attached to a stake 50. The stake 50 has on an end opposed from the adapter plate 52 a plurality of anchor prongs 54. The plurality of deformable prongs 54 are initially directed in a substantially downward direction before the stake is inserted into the ground (FIG. 5). The plurality of prongs 54 are deformed into a substantially upward direction after the stake 50 has been inserted into the ground, thereby providing resistance to removal of the stake 50 from the ground. In fact, the present invention has been found to be strong enough to actually provide a tying point for a horse. The stake 50 and deformable prongs 54 can be manufactured from any suitable material, such as steel.

Figure 4:
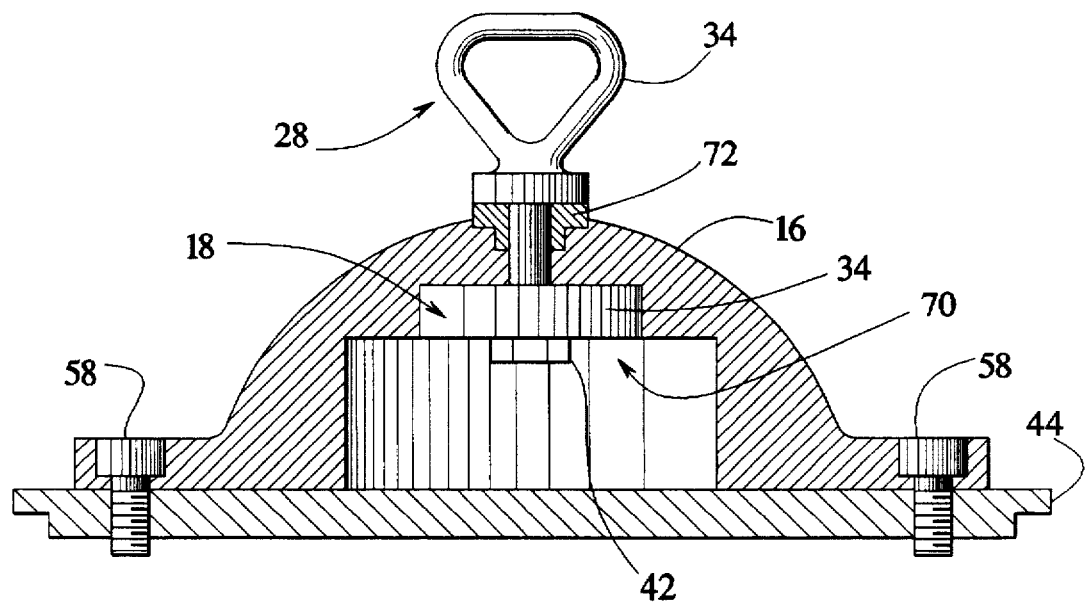
FIG. 4 is a cross-sectional view of the present invention.

A cross-sectional view of the present invention is also depicted in FIG. 4 showing the assembly of parts. Since the housing 16 has an internal cavity 70, water outlet grooves 56 are provided in the base 24 so that any water which may enter the internal cavity 70 can be removed. This is of benefit during winter so that water does not freeze in the cavity 70.

One improvement of the present invention over prior art devices in this field is that the leash will not tangle about the animal restraint device 10. Due to the no-catch contour of the connector 34 in the housing 16, as well as, the use of the sealed roller bearing 34 and seal 72.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An animal restraint device comprising:
   a housing having an internal swivel device, said housing having an aperture in a upper side thereof and a base on a lower side thereof, said housing having a predetermined outer configuration;
   a rotatable securing device having a first end attached to said swivel device, said first end of said securing device extending through said aperture, said rotatable securing device having a second end that forms a connector;
   a seal between said first end of said rotatable securing device and a wall of said aperture; and
   an adapter plate attached to said base of said housing;
   wherein said adapter plate is anchored in a predetermined area and wherein said connector is attached to a first end of a leash, an animal being attached to a second end of said leash.

2. The animal restraint device according to claim 1, wherein said animal restraint device further comprises a fastening system for attaching said adapter plate at a predetermined location in a vehicle.

3. The animal restraint device according to claim 1, wherein said animal restraint device further comprises a fastening system for attaching said adapter plate in the bed of a pickup-type vehicle.

4. The animal restraint device according to claim 1, wherein said animal restraint device further comprises a stake attached to said adapter plate on a side opposed to said base of said housing, said stake having a plurality of deformable prongs on an end opposed to an end of said stake that is attached to said adapter plate.

5. The animal restraint device according to claim 1, wherein the housing has an outer no-catch contour.

6. The animal restraint device according to claim 1, wherein said base has at least one water outlet groove in a bottom side thereof.

7. The animal restraint device according to claim 1, wherein said second end of said securing device has a no-catch configuration.

8. The animal restraint device according to claim 1, wherein said seal is water resistant.

9. An animal restraint device, comprising:
   a housing having an internal swivel device, said housing having an aperture in a upper side thereof and a base on a lower side thereof, said housing having a predetermined outer configuration;
   a rotatable securing device having a first end attached to said swivel device, said first end of said securing device extending through said aperture, said rotatable securing device having a second end that forms a connector;
   a seal between said first end of said rotatable securing device and a wall of said aperture; and
   an adapter plate attached to said base of said housing, said adapter plate anchored to a predetermined area that is composed of a material, and said connector attached to a first end of a leash, an animal being attached to a second end of said leash;
   a stake attached to said adapter plate on a side opposed to said base of said housing, said stake having a plurality of deformable prongs on an end opposed to an end of said stake that is attached to said adapter plate; and
   said plurality of deformable prongs initially directed in a substantially downward direction before said stake is inserted into the material, and said plurality of prongs deformed into a substantially upward direction after said stake has been inserted into the material, thereby providing resistance to removal of the stake from the material.

10. An animal restraint device, comprising:
   a housing having an internal swivel device, said housing having an aperture in a upper side thereof and a base on a lower side thereof, said housing having a predetermined outer configuration;
   a rotatable securing device having a first end attached to said swivel device, said first end of said securing device extending through said aperture, said rotatable securing device having a second end that forms a connector;
   a seal between said first end of said rotatable securing device and a wall of said aperture;
   an adapter plate attached to said base of said housing, said adapter plate anchored to said predetermined area, and said connector attached to a first end of a leash, an animal being attached to a second end of said leash;

said first end of said securing device being a threaded rod, and said swivel device being a sealed roller bearing having an aperture through which said threaded rod extends, and a nut assembly that receives the threaded rod and thereby locks the securing device to the swivel device.

11. A rotatable attachment device for use in a predetermined area, comprising:
- a housing having an internal swivel device, said housing having an aperture in a upper side thereof and a base on a lower side thereof, said housing having a predetermined no-catch contour, said base having at least one water outlet groove in bottom side thereof;
- a rotatable securing device having a first end attached to said swivel device, said first end of said securing device extending through said aperture, said rotatable securing device having a second end that forms a connector, said second end having a predetermined no-catch contour;
- a water resistant seal between said first end of said rotatable securing device and a wall of said aperture; and
- an adapter plate attached to said bottom side of said base of said housing;
- wherein said adapter plate is anchored to said predetermined area.

12. The rotatable attachment device according to claim 11, wherein said animal restraint device further comprises a fastening system for attaching said adapter plate at a predetermined location in a vehicle.

13. The rotatable attachment device according to claim 11, wherein said animal restraint device further comprises a fastening system for attaching said adapter plate in the bed of a pickup-type vehicle.

14. The rotatable attachment device according to claim 11, wherein said animal restraint device further comprises a stake attached to said adapter plate on a side opposed to said base of said housing, said stake having a plurality of deformable prongs on an end opposed to an end of said stake that is attached to said adapter plate.

15. A rotatable attachment device for use in a predetermined area composed of a predetermined material, comprising:
- a housing having an internal swivel device, said housing having an aperture in a upper side thereof and a base on a lower side thereof, said housing having a predetermined no-catch contour, said base having at least one water outlet groove in bottom side thereof;
- a rotatable securing device having a first end attached to said swivel device, said first end of said securing device extending through said aperture, said rotatable securing device having a second end that forms a connector, said second end having a predetermined no-catch contour;
- a water resistant seal between said first end of said rotatable securing device and a wall of said aperture;
- an adapter plate attached to said bottom side of said base of said housing;
- wherein said adapter plate is anchored to said predetermined area;
- a stake attached to said adapter plate on a side opposed to said base of said housing, said stake having a plurality of deformable prongs on an end opposed to an end of said stake that is attached to said adapter plate; and
- said plurality of deformable prongs initially directed in a substantially downward direction before said stake is inserted into the material, and said plurality of prongs deformed into a substantially upward direction after said stake has been inserted into the material, thereby providing resistance to removal of the stake from the material.

16. A rotatable attachment device for use in a predetermined area, comprising:
- a housing having an internal swivel device, said housing having an aperture in a upper side thereof and a base on a lower side thereof, said housing having a predetermined no-catch contour, said base having at least one water outlet groove in bottom side thereof;
- a rotatable securing device having a first end attached to said swivel device, said first end of said securing device extending through said aperture, said rotatable securing device having a second end that forms a connector, said second end having a predetermined no-catch contour;
- a water resistant seal between said first end of said rotatable securing device and a wall of said aperture;
- an adapter plate attached to said bottom side of said base of said housing;
- wherein said adapter plate is anchored to said predetermined area;
- said first end of said securing device being a threaded rod, and said swivel device being a sealed roller bearing having an aperture through which said threaded rod extends, and a nut assembly that receives the threaded rod and thereby locks the securing device to the swivel device.

17. An animal restraint device for holding an animal via a leash in a bed of a truck, comprising:
- a housing having an internal swivel device, said housing having an aperture in a upper side thereof and a base on a lower side thereof, said housing having a predetermined no-catch contour;
- a rotatable securing device having a first end attached to said swivel device, said first end of said securing device extending through said aperture, said rotatable securing device having a second end that forms a connector, said second end having a predetermined no-catch contour;
- said swivel device being a water resistant sealed roller bearing between said first end of said rotatable securing device and a wall of said aperture, said first end of said securing device being a threaded rod, said sealed roller bearing having an aperture through which said threaded rod extends, a nut assembly receiving the threaded rod and thereby locking the securing device to the swivel device; and
- an adapter plate anchored to said bed of said truck, said adapter plate being removable attached to said base of said housing;
- wherein said connector is attached to a first end of said leash, said animal being attached to a second end of said leash.

18. The animal resistant device according to claim 17, wherein said animal restraint device further comprises a stake attached to a further adapter plate on a side opposed to a side of said further adapter plate for attaching to said base of said housing, said stake having a plurality of deformable prongs on an end opposed to an end of said stake that is attached to said further adapter plate, said base of said housing being attached to said further adapter plate after being removed from said adapter plate in said bed of the truck.

19. The animal restraint device according to claim 18, wherein said plurality of deformable prongs are initially directed in a substantially downward direction before said stake is inserted into the ground, and wherein said plurality of prongs are deformed into a substantially upward direction after said stake has been inserted into the ground, thereby providing resistance to removal of the stake from the ground.

* * * * *